United States Patent [19]
McKown et al.

[11] 3,727,520
[45] Apr. 17, 1973

[54] DIGITAL ELECTROHYDRAULIC SERVO SYSTEM

[75] Inventors: Gary C. McKown; Gerald F. Simons; Frederick W. Lynch, all of Phoenix, Ariz.

[73] Assignee: Sperry Rand Corporation, New York, N.Y.

[22] Filed: Nov. 6, 1970

[21] Appl. No.: 87,552

[52] U.S. Cl. ................................. 91/433, 318/685
[51] Int. Cl. ..................... F15b 11/08, F15b 13/044
[58] Field of Search ........................... 91/433, 459

[56] References Cited

UNITED STATES PATENTS

| | | |
|---|---|---|
| 2,188,834 | 1/1940 | Fischel et al. ................. 91/433 X |
| 3,015,313 | 1/1962 | Faisandier ..................... 91/363 A |
| 3,125,856 | 3/1964 | Branson et al. ................. 91/433 |
| 3,258,025 | 6/1966 | Howland ....................... 91/433 X |
| 3,452,645 | 7/1969 | Barltrop ....................... 91/363 A |
| 3,554,084 | 1/1971 | Rasmussen et al. ............. 91/433 X |

Primary Examiner—Irwin C. Cohen
Attorney—S. C. Yeaton

[57] ABSTRACT

The invention comprises a single stage hydraulic control valve system having a plurality of discretely located monitoring pressure and position sensors and controlled by a digital control system through an interfacing stepper motor. The control valve system positions a controlled element in accordance with a command signal. The plurality of pressure and position sensors provide an operation check means for establishing a confidence level of the system operation.

5 Claims, 1 Drawing Figure

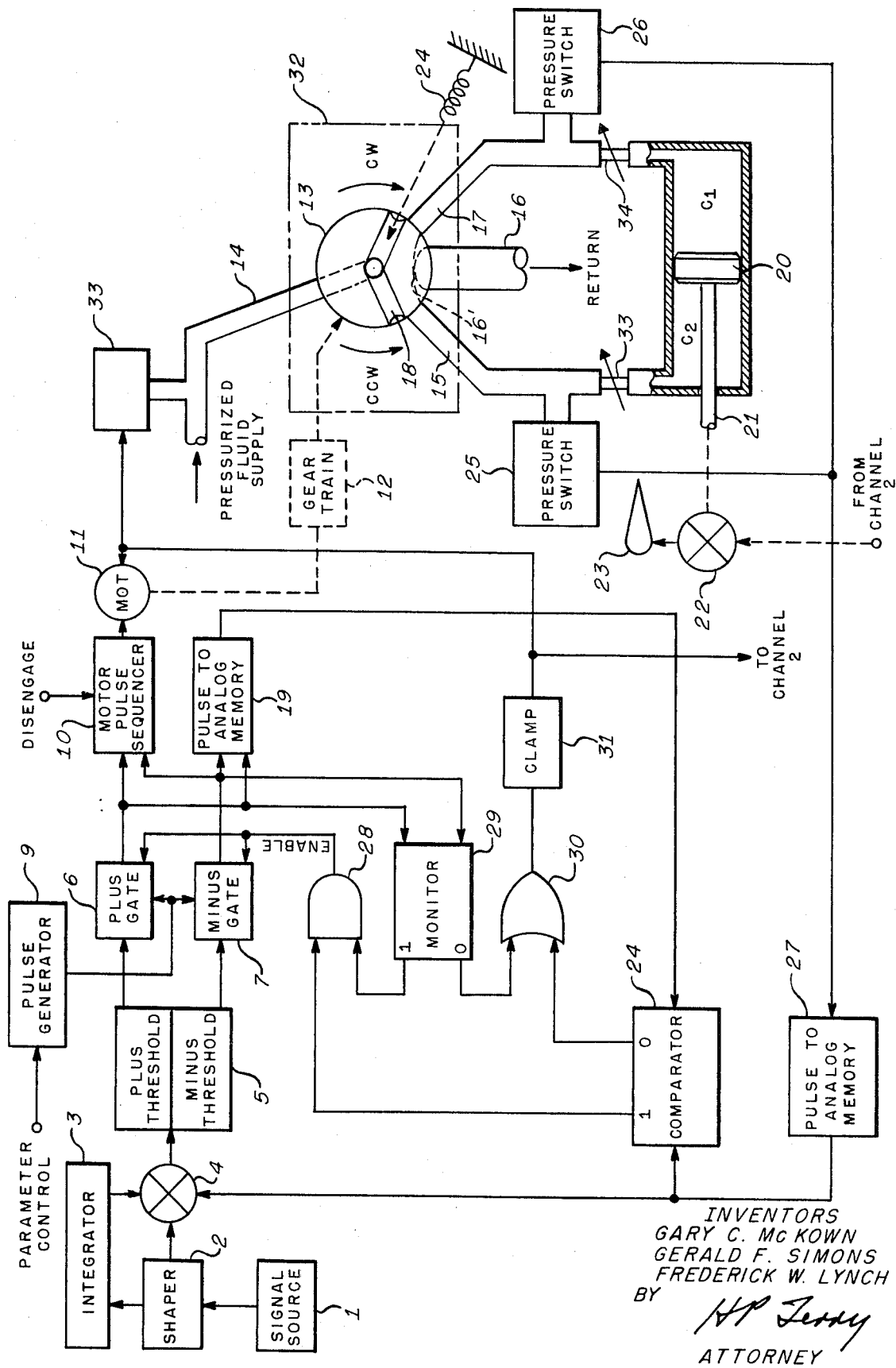

DIGITAL ELECTROHYDRAULIC SERVO SYSTEM

CROSS REFERENCES TO RELATED APPLICATIONS

This application includes a modification of the electronic circuitry described in the copending application entitled "Digital Automatic Control System with Pseudo Position Feedback and Monitor,"Ser. No. 31,986, filed Apr. 27, 1970, now U.S. Pat. No. 3,643,146 and a modification of the servo actuator system described in the copending application entitled "Digital Electrohydraulic Servo Actuator," filed Apr. 27, 1970, now U.S. Pat. No. 3,664,234. Both applications are assigned to the same assignee as the instant invention.

BACKGROUND OF THE INVENTION

1. Field of the Invention

The invention described is related to rotary hydraulic actuators for controlling an element by digital electronic commands having electromechanical interface means and including feedback means from the electronic and mechanical portions of the system. The use of digital techniques with feedback means permits an accurate incremental control of the actuator displacement and rate of displacement resulting in precise predetermined response of the controlled element.

2. Description of the Prior Art

Servo valves are generally analog in nature and must be two-stage to provide the necessary response required by high speed high power control systems. The first stage interfaces with the electronic command means and provides the necessary porting to drive the second, or power, stage. The feedback means used to obtain a closed loop operation required a mechanical displacement of a transducer in response to the analog electric commands. The systems were complex mechanically and required close tolerance characteristics for an acceptable degree of accuracy and therefore very costly.

SUMMARY OF THE INVENTION

The application describes a single stage rotary hydraulic valve controlled by a digital electronic and electromechanical control system. An input signal is processed to generate an equivalent series of pulses which drive a stepper motor in a desired direction dependent upon the polarity of the input signal. Concurrently, the pulses are also fed to a first memory whose output is indicative of the operability of the electronic position of the control circuitry. The stepper motor is mechanically connected to the rotor of the hydraulic valve where the rotor is constructed to effect incremental porting of hydraulic fluid into and out of a hydraulic ram dependent upon the incremental rotation of the valve. The output of a pressure sensor responsive to changes of hydraulic fluid pressure is fed to a second memory. The output of the second memory provides a closed loop pseudo feedback system. A monitoring scheme compares the outputs of the first and second memories and will disengage the system upon an indication of a failure within the system.

An added feature of the invention is that it may be used to provide a fail-operational capability in a dual channel system by disengaging the faulty channel without deteriorating the feedback and positional accuracy of the good channel.

A primary object of the invention is to provide a low cost digitally controlled rotating valve hydraulic system.

Another object of the invention is to provide an incrementally positionable rotary hydraulic valve closed loop system.

Another object of the invention is to provide a variable displacement rotary hydraulic valve system.

Another object of the invention is to provide a variable rate of displacement rotary hydraulic valve system.

Another object of the invention is to provide a monitoring capability for detecting a failure of any portion of the electrical ormechanical portions of a rotary hydraulic valve and control system.

Another object of the invention is to provide a fail-operational capability in a multiple channel rotary hydraulic system.

BRIEF DESCRIPTION OF THE DRAWING

The sole FIGURE illustrates the electronic and mechanical apparatus comprising the system of the invention.

DESCRIPTION OF THE PREFERRED EMBODIMENT

A detailed description of the electronics circuit is incorporated in a patent application entitled "Digital Automatic Control System with Pseudo Feedback and Monitor," Ser. No. 31,986, filed Apr. 27, 1970 and assigned to the instant assignee, now U.S. Pat. 3,643,646 dated Feb. 15, 1972 detailed description of a modification of the electronic control system is incorporated in a patent application entitled "Digital Electrohydraulic Servo Actuator," Ser. No. 31,905, filed Apr. 27, 1970, and assigned to the instant assignee, now U.S. Pat. 3,664,234 dated May 23, 1972.

Referring to the sole FIGURE, an input signal represented by the signal source 1 may be an analog signal indicative of a desired change, an error signal or a command signal. This initial command signal is shaped in shaper 2 to render it compatible with the circuit and to provide required system dynamics and appears at the summing junction 4. A take-off from the shaper output is fed through integrator 3 to isolate and determine long term errors, and its output also appears at summing junction 4. The algebraic sum of the signals from summing junction 4 is fed to a threshold circuit 5 having positive and negative levels. The initial signal as modified by the summing junction 4, if of sufficient absolute magnitude, will cause the threshold circuit 5 to enable either gates 6 or 7, depending upon the signal polarity. When either gate is enabled, the output of pulse generator 9 is fed to the motor pulse sequencer 10 which in turn provides the intelligence to drive the stepper motor 11 the desired number of steps usually dependent upon the magnitude of the command signal, in the desired rotational direction depending upon the polarity of the command signal. The pulse sequencer 10 has the characteristic, as set forth in the above identified copending application Ser. No. 31,905, that for every pulse or pulse train supplied to the stepper motor to rotate it in one direction, a corresponding pulse or pulse train in the opposite direction is supplied to the motor to bring it back to its initial or zero position. By an appropriate gear train 12, the rotor 13 of the rotary hydraulic valve 32 is incrementally displaced first in one direction and then in the opposite direction in proportion to the number of pulses supplied by the motor and controls the hydraulic fluid flow in corresponding pulses through pipes 14, 15, 16 and 17 and passages 18. The gear train 12 may be deleted without affecting the operability of the system and may in fact be the desired configuration from the standpoint of simplicity and economy. In the latter configuration, the displacement per step of the stepper motor 11 must be designed to effect a desired incremental opening and closing of the rotary hydraulic valve 32 with the associated pipes to obtain the requisite pulsing of hydraulic fluid.

The repetition rate of the pulse generator 9 may be preset or it may be variable through parameter control means. As will be later described, the pulse repetition rate determines the speed at which the rotor 13 rotates in response to the input signal.

The FIGURE illustrates the rotor 13 in the centered or pull position. Pipe 14 is connected to a pressurized fluid supply (not shown) and supplies hydraulic fluid to the center of passage 18 of rotor 13. On actuation of the stepper motor 11, the rotor 13, is caused to rotate in increments first in one direction and then in the opposite direction. Assuming that the rotation is clockwise, the passage 18 would rotate until its orifice would overlap at least a portion of the orifice of pipe 17. Concurrently, exhaust cavity 16' would rotate and overlap at least a portion of each of the orifices of pipes 15 and 16. Hydraulic fluid from pipe 14 would now flow through the rotor 13, into pipe 17 and exert pressure in cavity $C_1$. The increase in pressure in $C_1$ would create a pressure gradient across piston 20 and tend to force piston 20 into cavity $C_2$. As cavity 16' is adjacent both pipes 15 and 16, any build up in pressure in cavity $C_2$ is released by fluid flowing into the return pipe 16. The piston 20 is then free to move to the left at a rate determined by the pulse repetition frequency of the pulse train and the pressure of the source and arm 21 attached to the piston 20 will be correspondingly displaced. The arm 21 may be connected through a mechanical force summing junction 22 to controlled element 23. Element 23 is represented as a control surface for an airplane, but for the purpose of the invention, it may be any element for which precise incremental control is desired. As the stepper motor rotates in the opposite direction, the reverse sequence takes place until the valve is again closed and motion of the piston 20 stops in its displaced position.

If the rotor 13 rotation were in the counterclockwise direction i.e., minus gate 7 will open, the opposite of the foregoing would occur, the hydraulic fluid would flow from the passage 18 into pipe 15, and to cavity $C_2$. The return path for the fluid in cavity $C_1$ would be through pipe 17, cavity 16' and to pipe 16.

On cessation of the command pulse train actuating stepper motor 11 due to a possible failure in the system, the rotor 13 might remain in its commanded position and permit the piston 20 to be forced to either extremity. This is undesirable and a bias spring 24 may be operatively associated with the rotor 13 so that on cessation of a rotation command due to a failure the rotor 13 would return to its null position.

The rate of displacement of the piston 20 is dependent upon the quantity of fluid which is metered to the cavity during a given time period, and is proportional to the rate at which the port is opened. The rate of port opening is controlled by the stepping rate of the stepper motor 11, or the pulse repetition rate of the pulse generator 9. The displacement rate may be contingent upon any condition existing within the circuit, fixed or preselected, or manually variable and implemented by changing the repetition rate of the pulse generator 9. The displacement is normally controlled by the total amount of fluid introduced to the cavity and is related to the absolute magnitude of the input signal source, or, it may also be limited to a definite number of pulses. In this manner, both the amount and rate of displacement of the actuator may be individually controlled.

Concurrently with each pulse supplied to the motor pulse sequencer 10, a pulse is supplied to a pulse-to-analog memory element 19. The memory may be volatile or non-volatile depending on the designed system characteristics. Appropriate logic functions within the memory element 19 cause it to count up or count down in response to the pulses received. An assumption is made that the stepper motor 11 has in fact rotated in response to a pulse command and the analog signal output of the memory element 19 is fed as the first input to comparator 24.

Disposed within each pipe 15 and 17 is an orifice 33 and 34, respectively, which has a two-fold function. First, each orifice controls the rate of flow of fluid. Second, each orifice will have the effect of holding or sustaining the pressure within the pipes 15 and 17 for a predetermined time period. Associated with pipes 15 and 17 are two pressure sensors, 25 and 26, respectively, which have a signal output in response to a pressure pulse across their respective orifice. The output signal is fed to the pulse-to-analog memory element 27 and converted to an analog signal. A first output analog signal from memory element 27 provides a second input to comparator 24.

A second output analog signal of the memory element 27 is normally substantially equivalent to the input command, and is fed back to the summing junction 4. The algebraic sum of the signal from the shaper 2, integrator 3, and memory element 27 then becomes the system error signal presented to the threshold device 5. If it is assumed that the output of the integrator 3 is zero or negligible, then when the value of the error signal from the memory element 27 reaches the value of the error signal from the shaper 2, the output of the summing junction 4 is below the threshold limit, or zero. The error signal is then zero and the opened gate closes causing the pulse train to the motor pulse sequencer 10 to cease and the motor 11 will stop after completing its cycle back to zero.

The comparator 24 provides a first input to AND gate 28 if the signals received from memory elements 19 and 27 are equivalent. If the signals received by comparator 24 are not equivalent, a fault exists and it will provide an output to OR gate 30. If the monitor 29 receives a signal input from either of gates 6 or 7 and it will provide a second input to the AND gate 28 indicating that the system is operating properly. The AND gate 28 enables both gates 6 and 7. Obviously, under start up conditions, an initiating signal must be inserted to enable gates 6 and 7. If a fault condition exists whereby both gates 6 and 7 provide a simultaneous output, monitor 29 will sense a fault and provide an input to OR gate 30. An output from OR gate 30 will activate clamp 31 to transfer control and operational function to a duplicate channel and disengage the faulty system.

Associated with pipe 14 is a solenoid operated valve 33 which, when activated by clamp 31, cuts off the supply of hydraulic fluid. Thus, the hydraulic portion of the rotary valve 32 is ineffective. Secondly, clamp 31 energizes an appropriate set of coils within stepper motor 11 to lock it and prevent any rotation which might activate the rotary valve system 32. Thirdly, clamp 31 de-energizes a solenoid of the second channel equivalent to solenoid 33 to place the second channel rotary valve system in operation. It is anticipated that other connect and/or disconnect functions may be accomplished by clamp 31 and the above description is not intended to be limiting.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. In an electrohydraulic servo system for positioning a controlled member in accordance with an electric error signal, the combination comprising
    a hydraulic pressure actuator for positioning said control member,
    a source of high pressure hydraulic fluid for said actuator,
    a rotary control valve means coupled between said source and said actuator for controlling the flow of fluid therebetween,
    a stepper motor connected with and directly displacing said valve means,
    electrical error signal providing means including means responsive to predetermined threshold values of said error signal and of a sense corresponding to the sense of said error signal for supplying a first train of digital pulses to said stepper motor for incrementally rotating said valve means and porting corresponding increments of pressure fluid to said actuator,
    switch means responsive to said pressure fluid increments for supplying a second train of digital pulses corresponding to said pressure pulse train,
    converter means for converting said second digital pulse train to a feedback signal corresponding to the format of said error signal, and
    means for supplying said feedback signal to said error signal providing means for reducing said error signal below said threshold value.

2. The apparatus as set forth in claim 1 wherein said first train of pulses includes pulses of a sense to drive said stepper motor in one direction and a corresponding number of pulses of an opposite sense to drive said stepper motor back to its original position.

3. The apparatus as set forth in claim 2 further including monitoring means for monitoring the operation of the system, means responsive to said monitoring means for disabling said stepper motor upon failure of said system, and spring means coupled with said valve means for returning said valve means to its unoperated position.

4. The apparatus as set forth in claim 1 wherein said electrical error signal is an analog signal and wherein said converter means comprises a pulse to analog converter.

5. The apparatus as set forth in claim 1 further including means for varying the response of said actuator means including means for varying the pulse repetition frequency of said pulse train.

* * * * *